US012112415B2

(12) United States Patent
Russell, Jr. et al.

(10) Patent No.: US 12,112,415 B2
(45) Date of Patent: Oct. 8, 2024

(54) SYSTEMS AND METHODS FOR ANIMATED FIGURE DISPLAY

(71) Applicant: Universal City Studios LLC, Universal City, CA (US)

(72) Inventors: Michael David Russell, Jr., Orlando, FL (US); Harrison Smith, Orlando, FL (US); Daniel Roman Swando, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 266 days.

(21) Appl. No.: 17/704,316

(22) Filed: Mar. 25, 2022

(65) Prior Publication Data

US 2022/0327754 A1     Oct. 13, 2022

Related U.S. Application Data

(60) Provisional application No. 63/172,951, filed on Apr. 9, 2021.

(51) Int. Cl.
| | |
|---|---|
| *G06T 13/40* | (2011.01) |
| *A63J 19/00* | (2006.01) |
| *G03B 21/12* | (2006.01) |
| *G03B 21/54* | (2006.01) |
| *G06T 7/73* | (2017.01) |

(52) U.S. Cl.
CPC ............ *G06T 13/40* (2013.01); *A63J 19/006* (2013.01); *G03B 21/12* (2013.01); *G03B 21/54* (2013.01); *G06T 7/73* (2017.01)

(58) Field of Classification Search
None
See application file for complete search history.

(56) References Cited

U.S. PATENT DOCUMENTS

| | | | |
|---|---|---|---|
| 9,472,011 B2 | 10/2016 | Linnell | |
| 9,785,044 B2 | 10/2017 | Gocke | |
| 9,958,767 B1* | 5/2018 | Reichow | ................ G03B 21/58 |
| 9,997,092 B2 | 6/2018 | Sutherland et al. | |

(Continued)

OTHER PUBLICATIONS

PCT/US2022/022340 International Search Report and Written Opinion mailed Jul. 19, 2022.

(Continued)

*Primary Examiner* — Hilina K Demeter
(74) *Attorney, Agent, or Firm* — Fletcher Yoder, P.C.

(57) ABSTRACT

In an embodiment, an animated figure display system includes an animated figure having a body and a first tracker coupled to the body. The animated figure display system includes a projection surface having a second tracker coupled to the projection surface. The projection surface moves between a first position and a second position and the projection surface is at least partially concealed behind the animated figure in the first position. The animated figure display system includes a tracking camera that detects the first tracker and the second tracker and generates location data. A controller receives the location data and generates a control signal based on the location data. A projector receives the control signal indicative of image content from the controller and projects the image content onto the body of the animated figure and the external surface of the projection surface.

20 Claims, 7 Drawing Sheets

(56) References Cited

U.S. PATENT DOCUMENTS

| | | | | |
|---|---|---|---|---|
| 10,666,928 | B2* | 5/2020 | Liu | A61B 1/07 |
| 10,679,397 | B1* | 6/2020 | Churchill | G06F 3/0304 |
| 2011/0025853 | A1* | 2/2011 | Richardson | H04N 23/66 |
| | | | | 348/E7.085 |
| 2011/0248913 | A1* | 10/2011 | Willis | G06F 3/0346 |
| | | | | 345/156 |
| 2012/0038739 | A1* | 2/2012 | Welch | H04N 13/388 |
| | | | | 345/426 |
| 2014/0184496 | A1* | 7/2014 | Gribetz | G06F 3/0482 |
| | | | | 345/156 |
| 2015/0336015 | A1* | 11/2015 | Blum | G06V 20/54 |
| | | | | 472/137 |
| 2018/0122122 | A1* | 5/2018 | Reichow | G03B 21/10 |
| 2018/0255285 | A1* | 9/2018 | Hall | A63F 13/213 |
| 2020/0077148 | A1* | 3/2020 | Shirai | G06F 3/011 |
| 2020/0384374 | A1* | 12/2020 | Jeromin | A63F 13/80 |
| 2021/0092334 | A1* | 3/2021 | Flessas | B25J 19/023 |
| 2021/0205999 | A1* | 7/2021 | Mecca | G06T 7/73 |

OTHER PUBLICATIONS

Yapo et al., "Dynamic Projection Environments for Immersive Visualization," Jun. 13, 2010, Computer Vision and Pattern Recognition Workshops (CVPRW), IEEE, Piscataway, NJ, USA, pp. 1-8.

The Creators Project, "Box by Box & Dolly Behind the Scenes," Youtube, Oct. 1, 2013, XP054978143, Retrieved from the Internet: URL:https://www.youtube.com/watch?v=y4ajXJ3nj1Q [retrieved on Feb. 22, 2018], pp. 1-2.

\* cited by examiner

SYSTEMS AND METHODS FOR ANIMATED FIGURE DISPLAY

CROSS-REFERENCE TO RELATED APPLICATIONS

This application claims priority to and the benefit of U.S. Provisional Application No. 63/172,951, entitled "SYSTEMS AND METHODS FOR ANIMATED FIGURE DISPLAY," filed Apr. 9, 2021, which is hereby incorporated by reference in its entirety for all purposes.

BACKGROUND

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Amusement parks often contain attractions or experiences that use video and/or still images to provide enjoyment and entertainment to guests of the amusement parks. For example, the attractions may include themed environments established using display devices presenting media content (e.g., in the form of video, text, still imagery, motion graphics, or a combination thereof). For some attractions, it may be desirable to display media content with special visual effects to create a realistic and/or immersive viewing or playing experience for an audience. Amusement parks and other entertainment venues contain, among many other attractions, animated figures to entertain park guests that are queued for or within a ride experience. Certain animated figures may be figuratively brought to life by projection mapping, which traditionally directs predetermined appearances onto the animated figures. For example, a particular animated figure may be visually supplemented with projections of a pre-defined set of images, which may align with preprogrammed movements of the animated figure. However, displaying media content via projection mapping such as this may be challenging due to considerations relating to cost, space, equipment availability, viewing environment, and/or video (moving visual image) capabilities, for example.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, an animated figure display system includes an animated figure having a body and a first tracker coupled to the body. The animated figure display system also includes a projection surface having a second tracker coupled to the projection surface. The projection surface is configured to move between a first position and a second position and the projection surface is at least partially concealed behind the animated figure in the first position. The animated figure display system also includes a set of actuators configured to adjust the body of the animated figure and the projection surface and a tracking camera configured to detect the first tracker and the second tracker and configured to generate location data based on the first tracker and the second tracker. In the embodiment, the animated figure display system includes a controller communicatively coupled to the tracking camera. The controller is configured to receive the location data provided by the tracking camera and generate a control signal indicative of an image content to be projected onto the body of the animated figure and the projection surface based on the location data. The animated figure display system also includes a projector communicatively coupled to the controller. The projector is configured to receive the control signal indicative of the image content from the controller; and project the image content onto the body of the animated figure and the projection surface.

In an embodiment, an animated figure display system includes an animated figure having a body and a projection surface. The animated figure display system also includes a figure control system including a set of actuators configured to adjust the body of the animated figure and the projection surface and an actuator controller communicatively coupled to the set of actuators. The actuator controller is configured to instruct the set of actuators to adjust the body of the animated figure and the projection surface and generate actuator control data indicative of a position and an orientation for each actuator of the set of actuators. In the embodiment, the animated figure display system also includes a controller communicatively coupled to the actuator controller. The controller is configured to receive the actuator control data provided by the actuator controller and generate location data indicative of the position and the orientation of the body of the animated figure and the projection surface based on the actuator control data. The controller is also configured to generate a control signal indicative of an image content to be projected onto the body of the animated figure and the projection surface based on the location data.

In an embodiment, a method of operating an animated figure projection system includes instructing, via a controller, a set of actuators to begin a motion sequence for an animated figure and a projection surface. The method also includes receiving, via the controller, location data indicative of a current position and a current orientation of the animated figure and the projection surface and generating, via the controller, a control signal indicative of an image content to be projected onto a body of the animated figure and an exposed surface of the projection surface based on the current position and the current orientation. The method also includes instructing, via the controller, a projector to project the image content onto the body of the animated figure and the exposed surface of the projection surface.

Various refinements of the features noted above may be undertaken in relation to various aspects of the present disclosure. Further features may also be incorporated in these various aspects as well. These refinements and additional features may exist individually or in any combination.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Further, to the extent that certain terms such as parallel, perpendicular, and so forth are used herein, it should be understood that these terms allow for certain deviations from a strict mathematical definition, for example, to allow for deviations associated with manufacturing imperfections and associated tolerances.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to animated figure display systems. More particularly, the present disclosure relates to animated figure display systems for amusement park attractions and experiences. The attractions may include any type of ride system that is designed to entertain a passenger, such as an attraction that includes a ride vehicle that travels along a path, an attraction that includes a room or theatre with stationary or moving seats for passengers to sit in while the passengers view media content, an attraction that includes a pathway for guests to travel along, a room for guests to explore, or the like. Projection mapping involves projecting image content onto a mapped surface. The surface must first be mapped to determine the precise shapes and locations of different portions of the surface and coordinates need to be defined based on orientation and position from a projector. In addition, the image content then must be configured for use with the mapped surface, often requiring specialized software and skilled technicians to implement. However, displaying media content via projection mapping such as this may be challenging due to considerations relating to cost, space, equipment availability, viewing environment, and/or video (moving visual image) capabilities, for example. Instead, the animated figure display system of the present disclosure may be fitted with trackers that enable tracking cameras to discern movements, positions, and orientations of projection surfaces (e.g., an animated figure) in real-time. As such, the animated figure display system provides immersive viewing experiences for guests, but without the challenges and/or costs associated with providing such experiences using projection mapping. Additionally, while the disclosed embodiments generally discuss animated figure display systems that are used for entertainment purposes, some disclosed embodiments may also apply to systems that are used for any other suitable purpose.

Present embodiments are directed to an animated figure display system for an amusement park attraction and/or experience. Notably, the animated figure display system includes any number of projection surfaces, such as an animated figure, portions (e.g., limbs, body parts) of the animated figure, and/or additional projection surfaces which move independently of the animated figure, which may be projected onto with various visual effects to depict motion, special effects (e.g., fire, lightning, smoke), backgrounds, and so forth. As such, the animated figure display system provides a dynamic and immersive experience to guests, in which the animated figure resembles a live character and/or moving figure which reacts with image content projected onto additional projection surfaces. For example, imagery may be projected onto a body (e.g., a head, torso, legs, arms, or a combination thereof) of an animated figure to create an illusion of activity, energy, material, or the like. In certain embodiments, to enhance the authenticity of the animated figure, the animated figure and/or any number of projection surfaces may be fitted with trackers that enable tracking cameras of a tracking and media control system to discern movements, positions, and orientations of the animated figure and/or the projection surfaces in real-time via optical performance capture or optical motion capture. Thus, because the tracking and media control system may operate independently of the animated figure (e.g., by not directly relying on position, velocity, and/or acceleration control of actuators of the animated figure), the tracking and media control system may dynamically generate and display projected images onto the interactive animated figure and/or the projection surfaces that emulates live characters, movement, and/or reaction to other effects (e.g., environmental effects, visual effects, pyrotechnic effects, fluid flow effects) associated with the amusement park attraction or experience. In some embodiments, a figure control system may include an actuator controller (e.g., motor encoder) that controls movement of the animated figure and/or the projection surfaces and that generates and transmits actuator control data to the tracking and media control system. The tracking and media control system may process the actuator control data and generate location data for the animated figure and/or the projection surfaces based on the actuator control data. As will be understood, the tracking control system of certain embodiments, may generate and update location data including positions (e.g., including x, y, and z coordinates), orientations, and scale of the animated figure and/or the projection surfaces. As such, the tracking control system may utilize the location data to control any number of projectors in order to generate and display images (e.g., still image, video content) on to the animated figure and/or the projection surfaces to create an immersive and/or realistic viewing experience.

Figure 1:
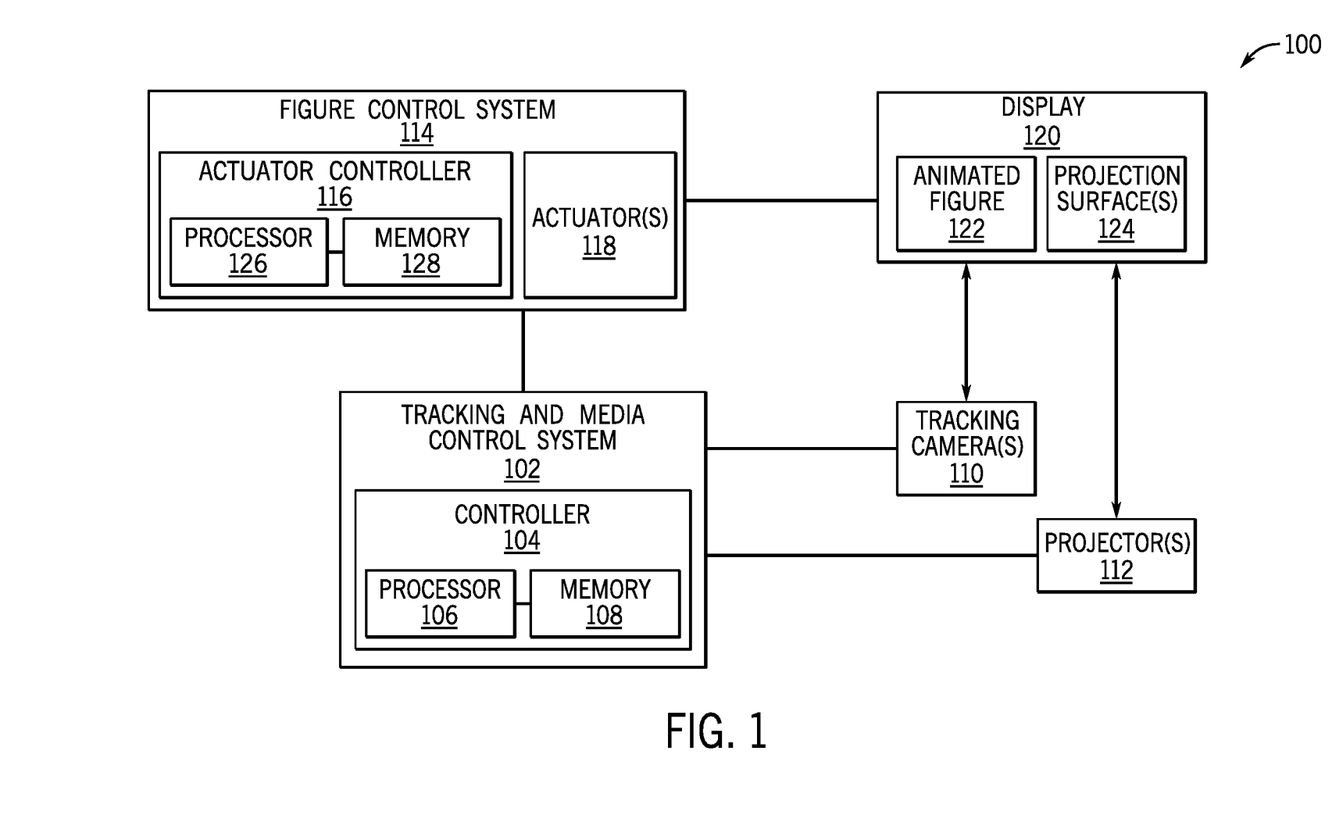
FIG. 1 is a block diagram of an animated figure display system, in accordance with an embodiment of the present disclosure.

With the foregoing in mind, FIG. 1 illustrates an animated figure display system 100 including a tracking and media control system 102, any number of tracking cameras 110, any number of projectors 112, a figure control system 114, and a display 120, according to an embodiment of the present disclosure. The animated figure display system 100 may be used to provide visual effects to the display 120 during an amusement park attraction and/or experience. In certain embodiments, the tracking and media control system 102 may be provided in the form of a computing device, such as a programmable logic controller (PLC), a personal computer, a laptop, a tablet, a mobile device (e.g., a smart phone), a server, or any other suitable computing device. The tracking and media control system 102 may control operation of the projectors 112 and the tracking cameras 110 and may process data received from the tracking cameras 110 and/or the figure control system 114. The tracking and media control system 102 may be coupled to tracking cameras 110, projectors 112, and/or the figure control system 114 by any suitable techniques for communicating data and control signals between the tracking and media control system 102 and the tracking cameras 110, projectors 112, and/or the figure control system 114, such as a wireless, optical, coaxial, or other suitable connection.

The tracking and media control system 102 may be a control system having multiple controllers, such as controller 104, each having at least one processor 106 and at least one memory 108. The tracking and media control system 102 may represent a unified hardware component or an assembly of separate components integrated through communicative coupling (e.g., wired or wireless communication). It should be noted that, in some embodiments, the tracking and media control system 102 may include additional illustrated features. For example, the tracking and media control system 102 may include the tracking cameras 110 and/or the projectors 112 and may be operable to communicate with a local display on a particular computing device. With respect to functional aspects of the tracking and media control system 102, the controller 104 may use information from the tracking cameras 110 (e.g., tracking data) and/or the figure control system 114 (e.g., actuator control data) to generate and update location data for an animated FIG. 122 and/or the projection surfaces 124 and to control operation of the projectors 112 based on the location data. Further, the tracking and media control system 102 may include communication features (e.g., a wired or wireless communication port) that facilitate communication with other devices (e.g., external sensors) to provide additional data for use by the tracking and media control system 102. For example, the tracking and media control system 102 may operate to communicate with local cameras and/or audio sensors to facilitate detection of guests for an amusement park attraction or experience, guest interaction with the animated FIG. 122 (e.g., waving, approaching within a threshold distance), and so forth.

The tracking and media control system 102 may be a control system having multiple controllers, such as the controller 104, each having at least one processor 106 and at least one memory 108. In some embodiments, the memory 108 may include one or more tangible, non-transitory, computer-readable media that store instructions executable by the processor 106 (representing one or more processors) and/or data to be processed by the processor 106. For example, the memory 108 may include random access memory (RAM), read only memory (ROM), rewritable non-volatile memory such as flash memory, hard drives, optical discs, and/or the like. Additionally, the processor 106 may include one or more general purpose microprocessors, one or more application specific processors (ASICs), one or more field programmable logic arrays (FPGAs), or any combination thereof. Further, the memory 108 may store tracking data obtained via the tracking cameras 110, actuator control data obtained via an actuation controller 116, display data transmitted to and displayed via the projectors 112, location data generated by the processor 106, and/or algorithms utilized by the processor 106 to help control operation of the projectors 112 based on location data and display data. Additionally, the processor 106 may process tracking data and/or actuator control data to determine location data including position and/or orientation of the animated FIG. 122 and/or the projection surfaces 124. In certain embodiments, the tracking and media control system 102 may include additional elements not shown in FIG. 1, such as additional data acquisition and processing controls, additional sensors and displays, user interfaces, and so forth.

The display 120 may be capable of depicting image content (e.g., still image, video, visual effects) to be viewed by one or more guests of an amusement park attraction and/or experience. In some embodiments, the display 120 may include any number of projection surfaces 124 and each projection surface may be capable of depicting image content. For example, the display 120 may include the animated FIG. 122 and any number of additional projection surfaces 124. In some embodiments, the animated FIG. 122 may include any number of portions (e.g., a body and limbs) and each portion may be capable of moving independently of any other portion. In some embodiments, the display 120 may include more than one animated FIG. 122 within a single amusement park attraction or experience. In certain embodiments, the display 120 may depict image content associated with the amusement park attraction and/or experience. For example, an amusement park ride may appear to take place in an active volcano and the display 120 may depict image content associated with the active volcano (e.g., flowing lava, fire).

In certain embodiments, the display 120 may include trackers (e.g., trackable markers) that are positioned on a surface of the animated FIG. 122 and/or any number of the projection surfaces 124. The trackers may be positioned on or within any suitable surface of the display 120 that enables the trackers to be concealed or obscured from guest viewing. In some embodiments, the trackers may be shaped as rounded cylinders or light emitting diodes, though it should be understood that the trackers may have any suitable shape, including spherical shapes, rectangular prism shapes, and so forth. The trackers enable the tracking cameras 110 to sense or resolve a position and/or an orientation of the animated FIG. 122 and/or the projection surfaces 124 within the amusement park attraction and/or experience, such as via optical performance capture or optical motion capture techniques. Optical performance capture or optical motion capture refers to a technique of recording motion of an object or person by capturing data from image sensors (e.g., tracking cameras 110) and trackers coupled to a surface. In some embodiments, the trackers may be active devices, which may emit an individualized signal to the tracking cameras 110. For example, the trackers may emit infrared light, electromagnetic energy, or any other suitable signal that is undetectable by guests while being distinguishable by the tracking cameras 110. Alternatively, the trackers may be passive devices (e.g., reflectors, pigmented portions) that do not emit a signal and that enable the tracking cameras 110 to precisely distinguish the passive devices from other portions of the animated FIG. 122 and/or the projection surfaces 124. In certain embodiments, the trackers may be flush with or recessed within an outer surface of the animated FIG. 122 and/or the projection surfaces 124. A type and/or configuration of the tracking cameras 110 may be individually selected to correspond to a type of the trackers. In certain embodiments, the tracking cameras 110 may be designed to receive signals from trackers (e.g., active devices) to sense the position and/or orientation of the animated FIG. 122 and/or the projection surfaces 124. Additionally or alternatively, the tracking cameras 110 may be designed to discern the trackers (e.g., passive devices) on an exposed surface of the animated FIG. 122 and/or the projection surfaces 124.

The figure control system 114 may control operation (e.g., motion, position, orientation) of the animated FIG. 122 and the projection surfaces 124 of the display 120. The figure control system 114 may be provided in the form of a computing device, such as a PLC, a personal computer, a laptop, a tablet, a mobile device (e.g., smart phone), a server, or any other suitable computing device. The figure control system 114 may be a control system having multiple controllers, such as the actuator controller 116, each having at least one processor 126 and at least one memory 128, and any number of actuators 118. In some embodiments, the memory 128 may include one or more tangible, non-transitory, computer-readable media that store instructions executable by the processor 126 (representing one or more processors) and/or data to be processed by the processor 126. For example, the memory 128 may include random access memory (RAM), read only memory (ROM), rewritable non-volatile memory such as flash memory, hard drives, optical discs, and/or the like. Additionally, the processor 126 may include one or more general purpose microprocessors, one or more application specific processors (ASICs), one or more field programmable gate arrays (FPGAs), or any combination thereof. Further, the memory 128 may store actuator control data obtained via the actuation controller 116 and/or algorithms utilized by the processor 126 to help control operation of the actuators 118. Additionally, the processor 126 may process actuator control data to determine location data including position and/or orientation of the animated FIG. 122 and/or the projection surfaces 124. In certain embodiments, the figure control system 114 may include additional elements not shown in FIG. 1, such as additional data acquisition and processing controls, additional sensors and displays, user interfaces, and so forth. The actuator controller 116 may instruct actuators 118 to adjust the position and/or orientation of any suitable components of the display 120, such as animated FIG. 122 and/or projection surfaces 124.

In certain embodiments, one or more actuators 118 may be physically coupled to a base of the animated FIG. 122 and/or projection surfaces 124 and may be capable of moving the display 120 laterally, longitudinally, and/or vertically. Additionally or alternatively, the animated FIG. 122 and/or projection surfaces 124 may be fitted with any number of actuators 118 that enable the animated FIG. 122 and/or projection surfaces 124 to move (e.g., ambulate, translate, rotate, pivot, lip synchronize) in a realistic and life-emulating manner. The actuators 118 may include servo motors, hydraulic cylinders, linear actuators, and so forth that are each positioned and coupled to develop relative motion between respective portions of the animated FIG. 122 and/or projection surfaces 124. For example, respective sets of actuators 118 may be positioned to move an arm of the animated FIG. 122, move an articulating jaw of the animated FIG. 122, manipulate a figure portion (e.g., a head portion, an arm portion, a torso portion, a leg portion) of the animated FIG. 122, move a projection surface 124 from a concealed position (e.g., inside or behind the animated FIG. 122), and/or move the animated FIG. 122 or a figure portion of the animated FIG. 122 from a concealed position (e.g., inside or behind any number of projection surfaces 124) during a portion of a motion sequence.

In some embodiments, the actuator controller 116 may receive a control signal to begin an operating sequence from the controller 104. For example, the controller 104 may generate and may transmit the control signal in response to detection of any number of guests in an amusement park attraction or experience and/or in response to a periodic timer (e.g., every five minutes, fifteen minutes, thirty minutes, and so forth). As such, the actuator controller 116 may generate and transmit an actuator control signal to the actuators 118 to begin a motion sequence for the animated FIG. 122 and/or the projection surfaces 124. In certain embodiments, the actuator controller 116 may generate and may monitor actuator control data for the actuators 118 of any number of portions of the animated FIG. 122 and/or the projection surfaces 124 and may determine a position and/or an orientation for any number of the actuators 118. For example, the actuators 118 may be hydraulic cylinders and the actuator controller 116 may monitor a fluid level and/or fluid pressure in any number of hydraulic cylinders, an extension amount of the hydraulic cylinder, a position of the hydraulic cylinder, an orientation of the hydraulic cylinder, and so forth. The actuator controller 116 may generate and may transmit actuator control data to the controller 104 of the tracking and media control system 102. Additionally or alternatively, the actuator controller 116 may generate location data based on the actuator control data. For example, the actuator controller 116 may determine a position and/or an orientation of any number of portions of the animated FIG. 122 and/or the projection surfaces 124. In some embodiments, the actuator controller 116 may transmit location data to the controller 104. Additionally or alternatively, the controller 104 may instruct the actuators 118 to begin a motion sequence for the animated FIG. 122 and/or the projection surfaces 124.

The controller 104 may control operation of the projectors 112 based on various inputs. For example, based on location data for the animated FIG. 122 and/or the projection surfaces 124, the controller 104 may cause the projectors 112 to present an image of lightning. The processor 106 may generate and transmit a control signal (e.g., via wired or wireless communication, via an antenna) to the projectors 112 to begin and/or alter display of images. The control signal may indicate what type of image to display on the animated FIG. 122 and/or projection surfaces 124. In certain embodiments, the displayed image may be associated with motion of one or more portion of the animated FIG. 122 and/or the projection surfaces 124 in order to provide an immersive and/or realistic viewing experience. For example, the controller 104 may generate and transmit a control signal to the actuator controller 116 to begin a motion sequence of the animated FIG. 122 and/or the projection surfaces 124. The motion sequence may include operating any number of the actuators 118 any number of times to move corresponding portions of the animated FIG. 122 and/or projection surfaces 124. For example, a simulated explosion may be depicted by projecting an image of an explosion (e.g., fire, shockwave) via the projectors 112 onto the animated FIG. 122 and/or projection surfaces 124 as the actuators 118 move one or more portions of the animated FIG. 122 and/or projection surfaces 124 away from a location of the simulated explosion. As another example, an electrical shock may be depicted by projecting an image of lightning onto one or more projection surfaces 124 and/or the animated FIG. 122 as the actuators 118 move one or more portions of the animated FIG. 122 to appear as muscle spasms.

The controller 104 may also control or coordinate with the tracking cameras 110, which may be operated to ascertain location information for the animated FIG. 122 and/or the projection surfaces 124. As a specific example, the tracking camera(s) 110 may be an infrared camera that operates to detect an emitted infrared signal from a tracker. The controller 104 may receive information based on such detections and process the information to determine and monitor a location and/or an orientation for the animated FIG. 122 and/or the projection surfaces 124. The controller 104 may control operation of the projectors 112 based on the determined location and/or orientation. For example, the controller 104 may change an operating state (e.g., turn off, turn on, display image content) for one or more projectors 112 based on the determined location and/or orientation of the animated FIG. 122 and/or the projection surfaces 124. For instance, an actuator 118 may move a portion of the animated FIG. 122 to expose a previously covered projection surface 124. The tracking cameras 110 may detect trackers on an exposed surface of the newly uncovered projection surface 124 and may generate location data based on the detection. The controller 104 may receive the location data from the tracking cameras 110 and may instruct the projectors 112 to depict image content on the newly uncovered projection surface 124. As such, the controller 104 may adjust the image content displayed by the projectors 112 based on location data for the animated FIG. 122 and/or the projection surfaces 124.

Additionally, the controller 104 may determine the end of a motion sequence for the animated FIG. 122 and/or projection surfaces 124 based on location data. For example, the controller 104 may receive location data via the tracking cameras 110 and the processor 106 may process the location data to determine a location and/or orientation of the animated FIG. 122 and/or the projection surfaces 124. The processor 106 may determine that the animated FIG. 122 and/or the projection surfaces 124 are in a standard or default pose indicating a completion of a motion sequence. In this instance, the controller 104 may generate and transmit a control signal to one or more projectors 112 to stop projecting image content and/or turn off. Additionally or alternatively, the processor 106 may determine that a position and/or orientation of the animated FIG. 122 and/or the projection surfaces 124 is stationary for equal to or greater than a threshold time period (e.g., five seconds, thirty seconds, one minute, and so forth). The controller 104 may generate and transmit a control signal to one or more projectors 112 to stop projecting image content and/or turn off. In some embodiments, the controller 104 may generate and transmit a control signal to instruct the actuators 118 to begin a motion sequence based on the location data. For example, the processor 106 may determine the animated FIG. 122 and/or the projection surfaces 124 are in a ready or standby pose indicating a motion sequence may begin. In this instance, the controller 104 may generate and transmit a first control signal to instruct the actuators 118 to begin a motion sequence and may generate and transmit a second control signal to instruct the projectors 112 to change an operating state and/or begin a display sequence for image content.

Figure 2:
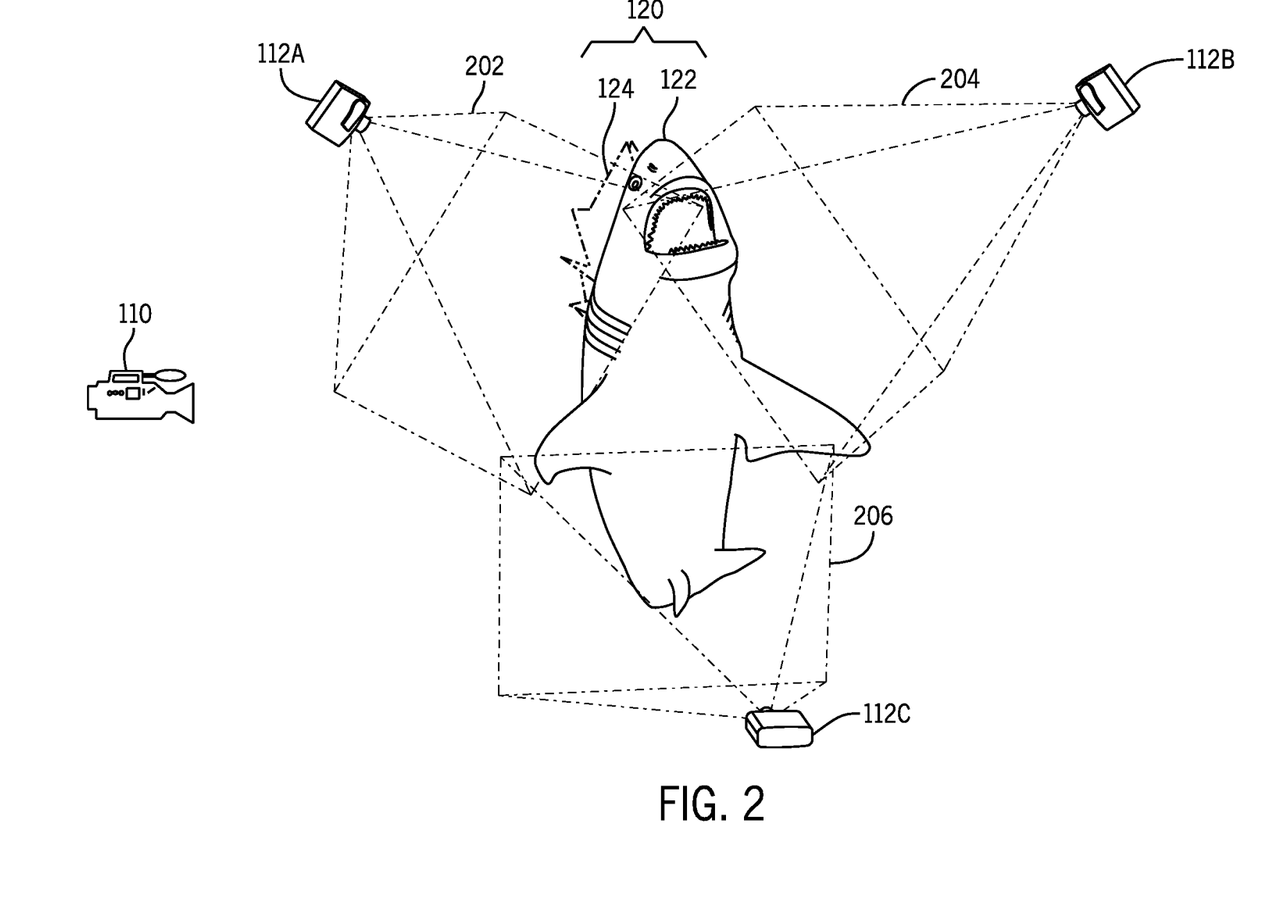
FIG. 2 is a perspective view of an animated figure incorporating the animated figure display system of FIG. 1, in accordance with an embodiment of the present disclosure.

With the foregoing in mind, FIG. 2 illustrates a perspective view of the animated FIG. 122 incorporating the animated figure display system 100 of FIG. 1, in accordance with an embodiment of the present disclosure. One or more projectors 112A, 112B, 112C may receive control signals from a control system, such as the tracking and media control system 102 of FIG. 1. First projector 112A may project a first portion 202 of image content, second projector 112B may project a second portion 204 of image content, and third projector 112C may project a third portion 206 of image content onto one or more projection surfaces 124 and/or a portion of the animated FIG. 122. Tracking camera 110 may be an infrared camera and may detect trackers on an exposed surface of the animated FIG. 122 and/or the projection surfaces 124. As shown in FIG. 2, the projection surfaces 124 may be at least partially concealed from being viewed by the guests of the amusement park attraction or experience. For example, the projection surfaces 124 may be hidden from view by a portion of the animated FIG. 122 in a first position.

Figure 3:
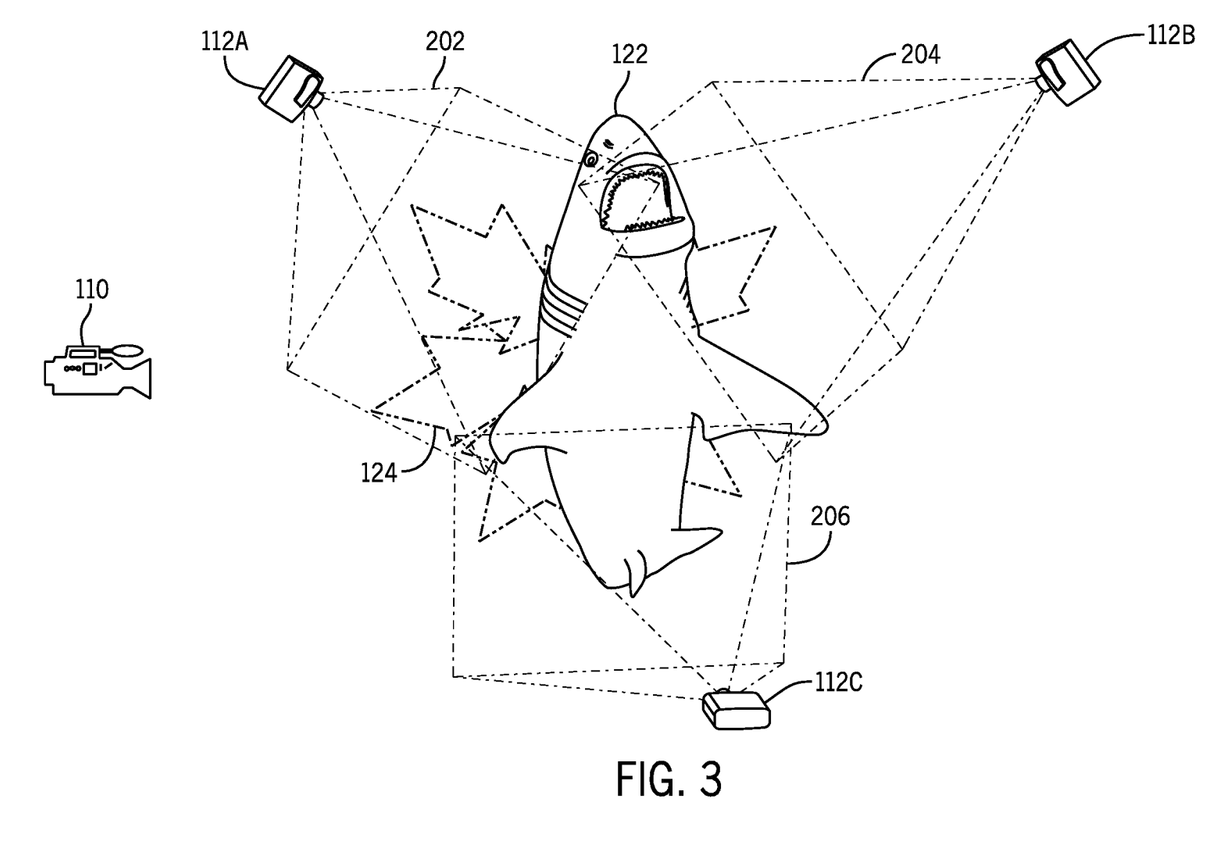
FIG. 3 is a perspective view of an animated display featuring the animated figure of FIG. 2, in accordance with an embodiment of the present disclosure.

With the foregoing in mind, FIG. 3 illustrates a perspective view of the animated FIG. 122 with the projection surfaces 124 in a second position, in accordance with an embodiment of the present disclosure. Actuators, such as the actuators 118 in FIG. 1, may move the projection surfaces 124 between a first position (e.g., at least partially concealed from being viewed by the guests and behind the animated FIG. 122) depicted in FIG. 2 and the second position (e.g., visible to guests of the amusement park attraction or experience) during a portion of a motion sequence. In the second position, trackers on the projection surfaces 124 may be detected by the tracking camera 110. The tracking camera 110 may generate and transmit location data based on the detection. For example, a control system, such as the tracking and media control system 102 of FIG. 1, may receive the location data and may control operation of the projectors 112A, 112B, 112C based on the location data. In certain embodiments, the tracking and media control system 102 may adjust an operational state of one or more of the projectors 112A, 112B, 112C based on detection of the projection surfaces 124. As such, the tracking and media control system 102 may adjust image content displayed on the animated FIG. 122 and/or the projection surfaces 124 based on monitored location data received via the tracking camera 110.

Figure 4:
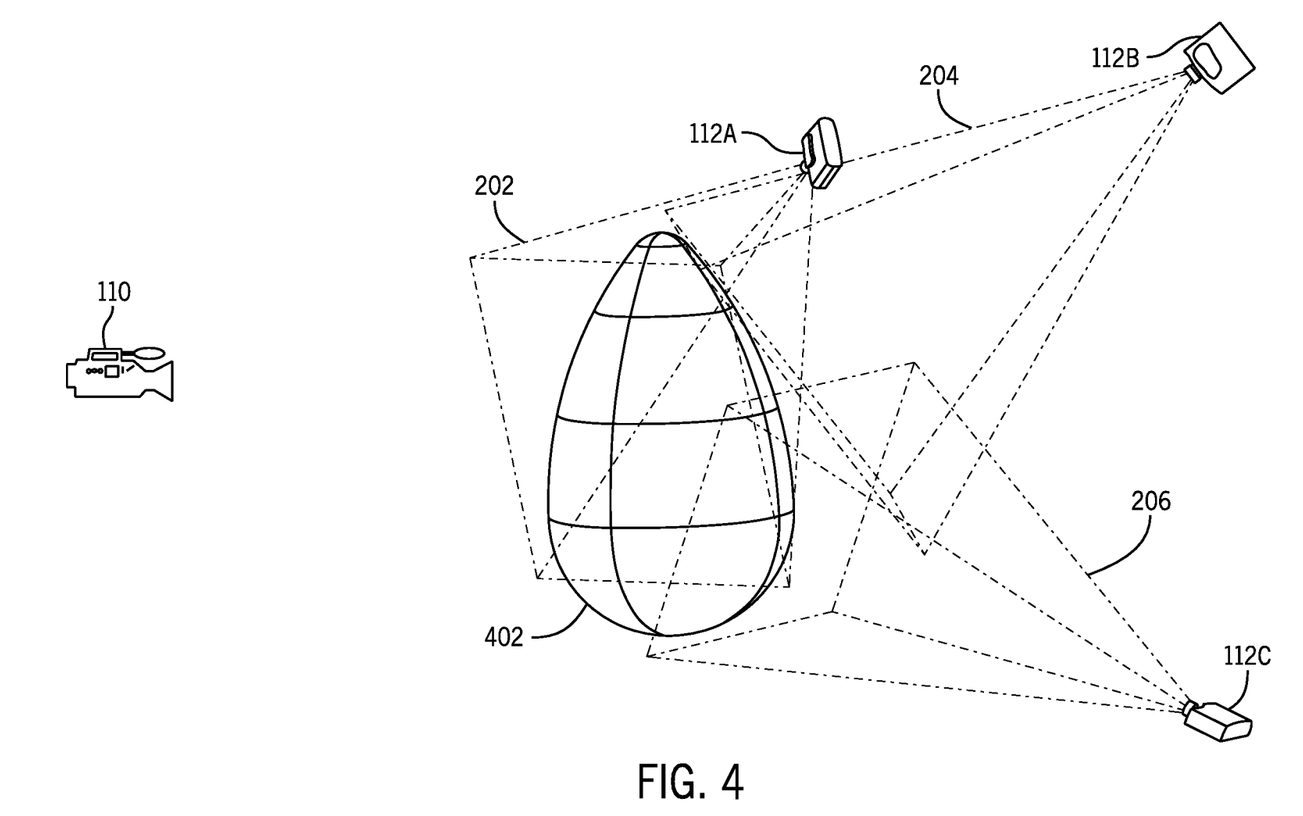
FIG. 4 is a perspective view of another animated figure incorporating the animated figure display system of FIG. 1, in accordance with an embodiment of the present disclosure.

With the foregoing in mind, FIG. 4 illustrates a perspective view of another animated FIG. 402 (e.g., an egg that operates to fragment) incorporating the animated figure display system 100 of FIG. 1, in accordance with an embodiment of the present disclosure. In this instance, the projection surfaces 124 may be completely hidden from view of the guests of the amusement park attraction or experience. For example, the projection surfaces 124 may be concealed within the animated FIG. 402 in a first position, as shown in FIG. 4. The projectors 112A, 112B, 112C may project the first portion 202, the second portion 204, and the third portion 206 of image content on an exposed surface of the animated FIG. 402.

Figure 5:
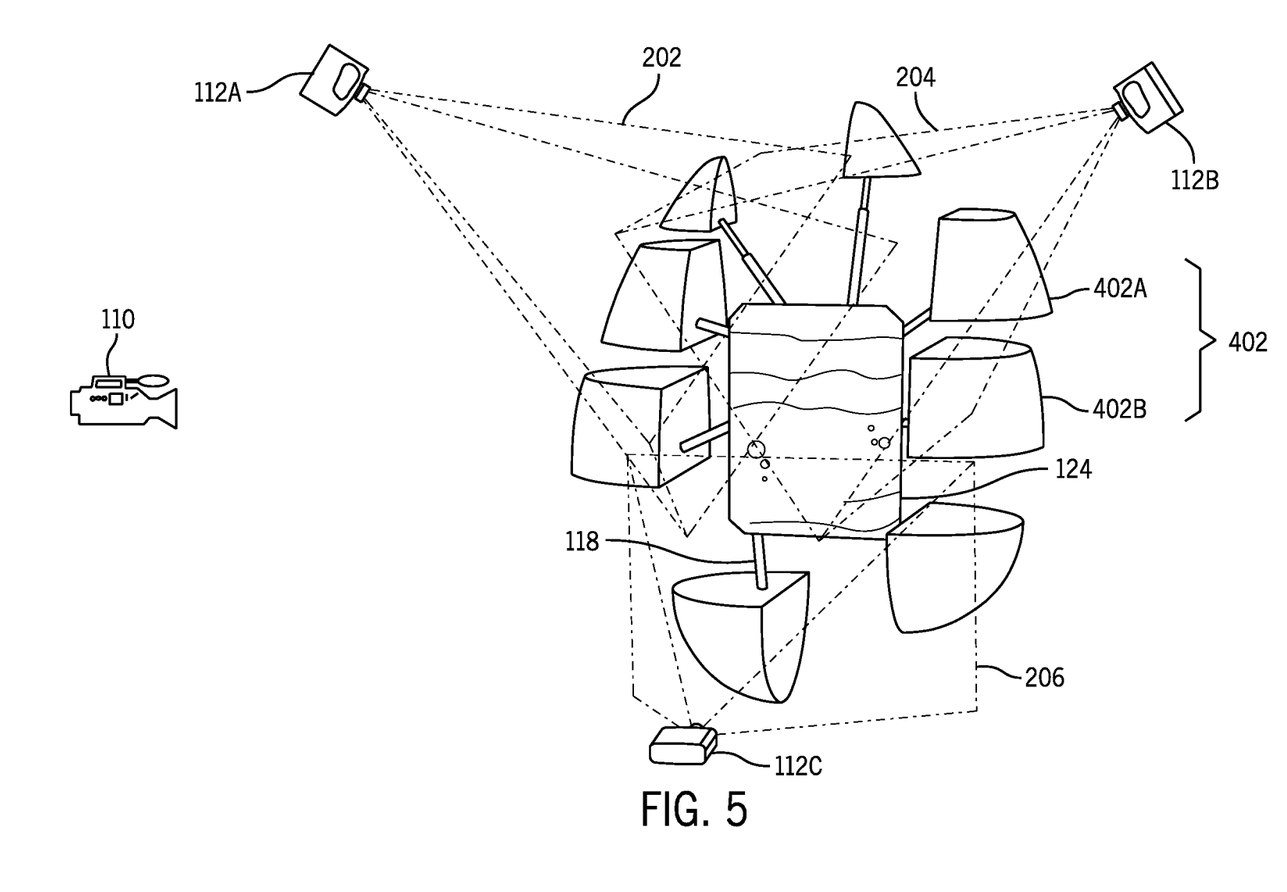
FIG. 5 is a perspective view of an animated display featuring the animated figure of FIG. 4, in accordance with an embodiment of the present disclosure.

FIG. 5 illustrates a perspective view of the animated FIG. 402 in a second position, in accordance with an embodiment of the present disclosure. Actuators, such as actuator 118, may move one or more portions, such as first portion 402A and second portion 402B, between the first position (e.g., where the projection surface 124 is concealed within the animated FIG. 402 as depicted in FIG. 4) and the second position (e.g., where the projection surface 124 is at least partially exposed and visible to guests of the amusement park attraction or experience) as depicted in FIG. 5. In the second position, trackers on the projection surface 124 may be detected by the tracking camera 110. The tracking camera 110 may generate and transmit location data based on the detection and the tracking and media control system 102 (FIG. 1) may receive the location data and may control operation of the projectors 112A, 112B, 112C based on the location data. For example, the tracking and media control system 102 may instruct the projectors 112 to depict a simulated interior of the animated FIG. 402.

Figure 6:
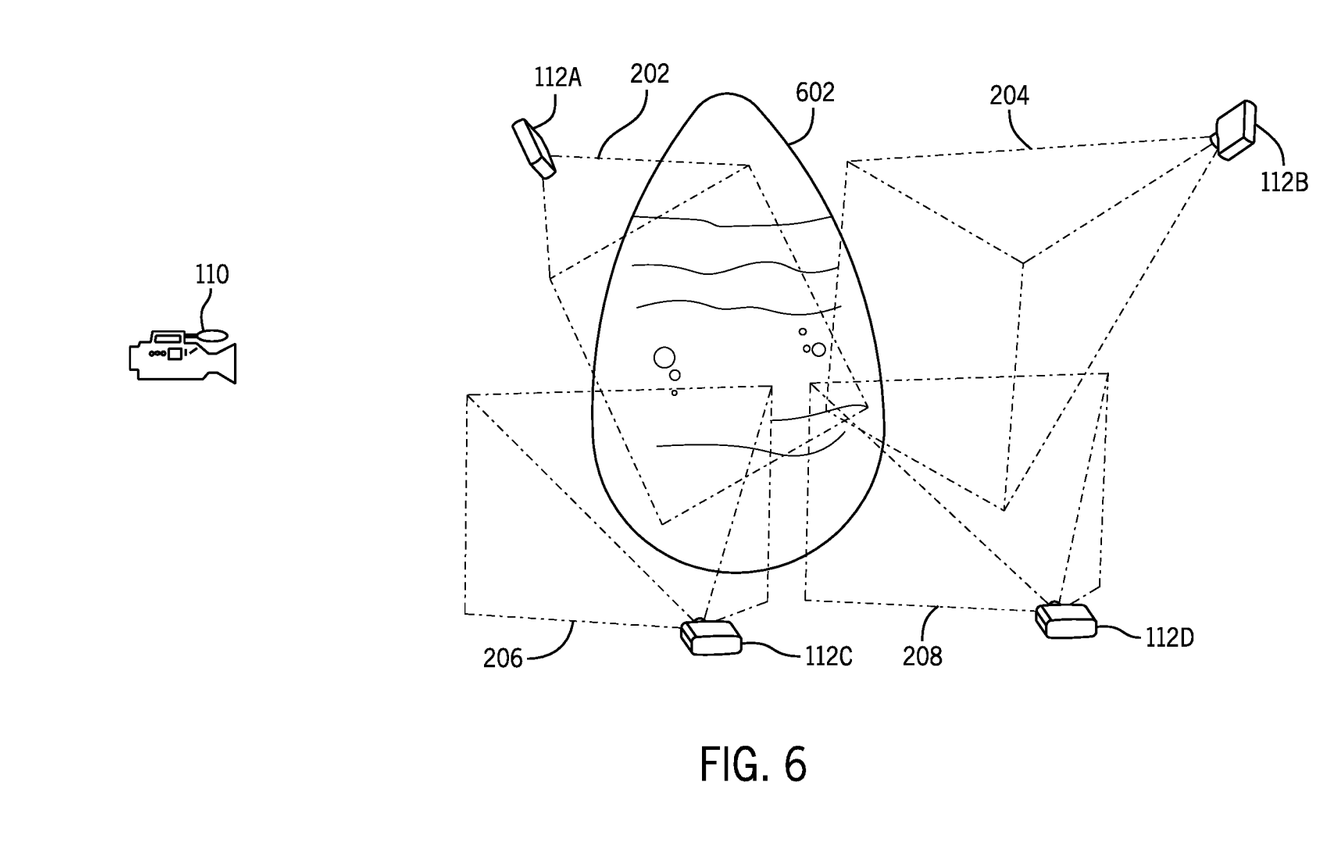
FIG. 6 is a perspective view of a projection surface incorporating the animated figure display system of FIG. 1, in accordance with an embodiment of the present disclosure.

FIG. 6 illustrates a perspective view of another projection surface 602 incorporating the animated figure display system 100 of FIG. 1, in accordance with an embodiment of the present disclosure. One or more projectors 112A, 112B, 112C, 112D may receive control signals from a control system, such as the tracking and media control system 102 of FIG. 1. The projectors 112A, 112B, 112C, 112D may each project a portion 202, 204, 206, 208 of the image content onto the projection surface 602. In this instance, an animated figure, such as the animated FIG. 122 of FIG. 1, may be concealed within the projection surface 602.

Figure 7:
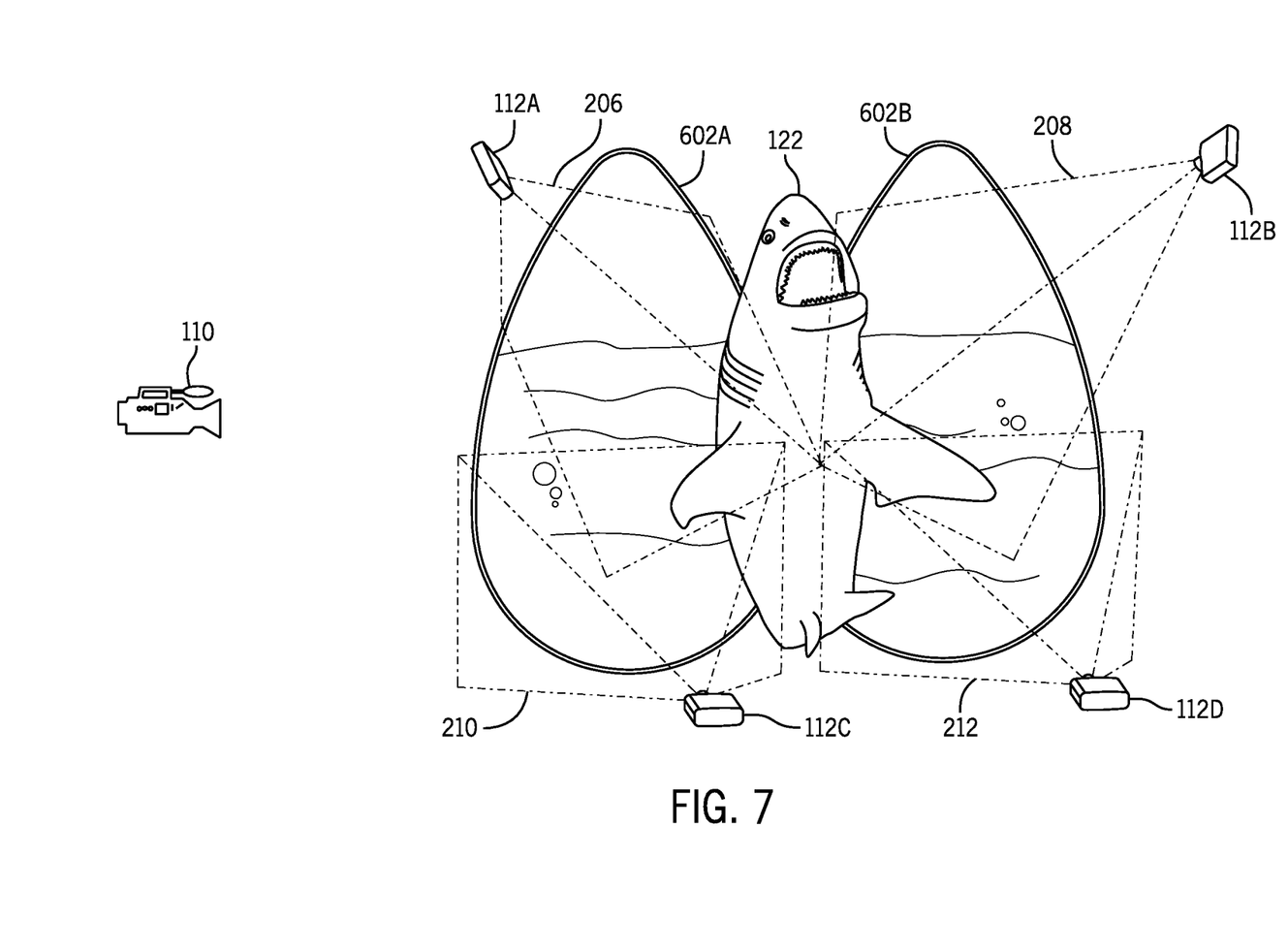
FIG. 7 is an example of an animated display featuring the projection surface of FIG. 6, in accordance with an embodiment of the present disclosure.

With the foregoing in mind, FIG. 7 illustrates a perspective view of the projection surface 602 of FIG. 6 in a second position, in accordance with an embodiment of the present disclosure. Actuators, such as the actuator 118 in FIG. 1, may move one or more projection surfaces, such as first projection surface 602A and second projection surface 602B, between a first position (e.g., where the animated FIG. 122 is concealed and/or hidden behind the projection surface 602) and the second position (e.g., where the animated figure is visible to guests of the amusement park attraction or experience) as depicted in FIG. 7. In the second position, trackers on the animated FIG. 122 may be detected by the tracking camera 110. The tracking camera 110 may transmit location data based on the detection, and the tracking and media control system 102 may receive the location data and may control operation of the projectors 112A, 112B, 112C, 112D, based on the location data. For example, the projectors 112 may depict image content on the projection surface 602 and the animated FIG. 122 such that the animated FIG. 122 appears to be emerging from the inside of the projection surface 602 (e.g., an egg).

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. An animated figure display system, comprising:
   an animated figure having a body and a first tracker coupled to the body;
   a projection surface having a second tracker coupled to the projection surface, wherein the projection surface is configured to move between a first position and a second position, and wherein the projection surface is at least partially concealed behind the animated figure in the first position;
   a set of actuators configured to adjust the body of the animated figure and the projection surface;
   a tracking camera configured to detect the first tracker and the second tracker and configured to generate location data based on the first tracker and the second tracker;
   a controller communicatively coupled to the tracking camera, wherein the controller is configured to:
      receive the location data provided by the tracking camera;
      generate a control signal indicative of an image content to be projected onto the body of the animated figure and the projection surface based on the location data; and
   a projector communicatively coupled to the controller, wherein the projector is configured to:
      receive the control signal indicative of the image content from the controller; and
      project the image content onto the body of the animated figure and the projection surface.

2. The system of claim 1, wherein the controller is configured to determine a current position and a current orientation of the projection surface based on the location data.

3. The system of claim 1, wherein the controller is configured to determine a current position and a current orientation of the body of the animated figure based on the location data.

4. The system of claim 1, wherein the controller is configured to instruct the projector to change an operating state based on the location data.

5. The system of claim 1, wherein the projector is configured to:
   project the image content onto the body of the animated figure in the first position; and
   project the image content onto the body of the animated figure and the projection surface in the second position.

6. The system of claim 1, wherein the tracking camera is configured to determine a current position and a current orientation of the projection surface based on the location data.

7. The system of claim 1, comprising an actuator controller communicatively coupled to the set of actuators, wherein the actuator controller is configured to:
   receive a control signal to begin a motion sequence for the animated figure and the projection surface; and
   instruct the set of actuators to begin the motion sequence.

8. The system of claim 7, wherein the actuator controller is configured to generate actuator control data based on a position and an orientation of the set of actuators.

9. The system of claim 8, wherein the controller is configured to:
   receive the actuator control data;
   determine a first current position and a first current orientation of the body of the animated figure based on the actuator control data; and determine a second current position and a second current orientation of the projection surface based on the actuator control data.

10. The system of claim 9, wherein the controller is configured to generate a second control signal indicative of a second image content to be projected onto the body of the animated figure and the projection surface based on the actuator control data.

11. The system of claim 1, wherein the first tracker is one of a first set of trackers and the second tracker is one of a second set of trackers, each tracker of the first and second sets of trackers being configured to emit an infrared signal, and wherein the tracking camera is an infrared camera configured to detect infrared signals.

12. An animated figure display system, comprising:
an animated figure having a body;
a projection surface;
a figure control system, comprising:
a set of actuators configured to adjust the body of the animated figure and the projection surface;
an actuator controller communicatively coupled to the set of actuators, wherein the actuator controller is configured to:
instruct the set of actuators to adjust the body of the animated figure and the projection surface; and
generate actuator control data indicative of a position and an orientation for each actuator of the set of actuators; and
a controller communicatively coupled to the actuator controller, wherein the controller is configured to:
receive the actuator control data provided by the actuator controller;
generate location data indicative of the position and the orientation of the body of the animated figure and the projection surface based on the actuator control data; and
generate a control signal indicative of an image content to be projected onto the body of the animated figure and the projection surface based on the location data.

13. The system of claim 12, comprising a projector communicatively coupled to the controller, wherein the projector is configured to:
receive the control signal indicative of the image content from the controller; and
project the image content onto the body of the animated figure and the projection surface, wherein the set of actuators are configured to adjust the body of the animated figure and the projection surface during a motion sequence.

14. The system of claim 13, wherein the animated figure is at least partially concealed within a portion of the projection surface during a portion of the motion sequence.

15. The system of claim 13, wherein the projection surface is at least partially concealed within a portion of the animated figure during a portion of the motion sequence.

16. The system of claim 13, wherein the projection surface is at least partially concealed behind the animated figure during a portion of the motion sequence.

17. A method of operating an animated figure projection system, the method comprising:
instructing, via a controller, a set of actuators to begin a motion sequence for an animated figure and a projection surface;
receiving, via the controller, first actuator control data from a portion of the set of actuators configured to control positioning of the animated figure;
receiving, via the controller, second actuator control data from an additional portion of the set of actuators configured to control positioning of the projection surface;
generating, via the controller, location data indicative of a first current position and a first current orientation of the animated figure based on the first actuator control data, and of a second current position and a second current orientation of the projection surface based on the second actuator control data;
generating, via the controller, a control signal indicative of an image content to be projected onto a body of the animated figure and an exposed surface of the projection surface based on the location data; and
instructing, via the controller, a projector to project the image content onto the body of the animated figure and the exposed surface of the projection surface.

18. The method of claim 17, comprising receiving, via the controller, actuator control data indicative of a current actuator position and a current actuator orientation of each actuator of the set of actuators, wherein the actuator control data comprises the first actuator control data and the second actuator control data.

19. The method of claim 18, comprising determining, via the controller, the first current position and the first current orientation of the animated figure and the second current position and the second current orientation of the projection surface based on the actuator control data.

20. The method of claim 17, comprising:
receiving, via the controller, tracking data from a tracking camera coupled to the controller, wherein the tracking camera is configured to detect a set of trackers coupled to the exposed surface of the projection surface and the body of the animated figure; and
generating, via the controller, the location data indicative of the first current position and the first current orientation of the animated figure and the second current position and the second current orientation of the projection surface based on the tracking data.

* * * * *